3,078,320
Patented Feb. 19, 1963

3,078,320
ISOMERIZATION OF UNSATURATED COMPOUNDS
Walter G. Toekelt, Downers Grove, Ill., assignor to Universal Oil Products Company, Des Plaines, Ill., a corporation of Delaware
No Drawing. Filed Dec. 9, 1960, Ser. No. 74,764
10 Claims. (Cl. 260—683.2)

This invention relates to a process for the isomerization of unsaturated compounds and particularly to a process for the isomerization of olefinic hydrocarbons.

Many unsaturated organic compounds such as olefinic hydrocarbons may find a wider and more beneficial use in certain fields of chemistry or as intermediates in the preparation of other organic compounds when the double bond is in a position in the chain different from that of an original compound. For example, isoprene which is a much desired intermediate for the preparation of synthetic rubber, the uses of said rubber being innumerable and varied, may be prepared by the demethanation of 2-methyl-2-pentene, said 2-methyl-2-pentene being prepared by the dimerization of propylene. However, when dimerizing propylene, many other isomeric hexenes are also produced. Therefore, it is advantageous to treat the isomeric hexenes other than 2-methyl-2-pentene in a manner whereby the desired product, as hereinbefore set forth, namely 2-methyl-2-pentene, is produced. In addition to the isomerization of isomeric hexenes the process of the present invention may also be utilized in the isomerization of other unsaturated compounds such as the butenes, etc., whereby the more preferred isomers are obtained thereby.

It is therefore an object of this invention to provide a process for the isomerization of unsaturated organic compounds.

A further object of this invention is to provide a process for isomerizing olefinic hydrocarbons by utilizing a novel catalyst therefor.

One embodiment of this invention resides in the process for the isomerization of an unsaturated organic compound which comprises contacting said compound with a catalyst selected from the group consisting of benzene polycarboxylic acids and anhydrides thereof at isomerization conditions, and recovering the resultant isomerized compounds.

A further embodiment of the invention is found in a process for the isomerization of an olefinic hydrocarbon which comprises contacting said hydrocarbon with a catalyst selected from the group consisting of benzene polycarboxylic acids and anhydrides thereof at a temperature in the range of from about 0° to about 300° C. and at a pressure in the range of from about atmospheric to about 100 atmospheres, and recovering the resultant isomerized hydrocarbons.

Yet another embodiment of this invention is found in a process for the isomerization of an olefinic hydrocarbon which comprises contacting said hydrocarbon with a catalyst consisting essentially of trimellitic anhydride at a temperature in the range of from about 0° to about 300° C. and at a pressure in the range of from about atmospheric to about 100 atmospheres, and recovering the resultant isomerized hydrocarbons.

A specific embodiment of this invention resides in a process for the isomerization of hexenes which comprises contacting said hexenes with trimellitic anhydride at a temperature in the range of from about 200° to about 275° C. and at a pressure in the range of from about 25 to about 50 atmospheres, and recovering the resulting isomerized hexenes.

Other objects and embodiments referring to alternative unsaturated compounds and to alternative novel isomerization catalysts will be found in the following further detailed description of the invention.

As hereinbefore set forth, it has now been discovered that unsaturated organic compounds such as olefinic hydrocarbons which contain only carbon and hydrogen atoms may undergo isomerization when contacted with an isomerization catalyst consisting essentially of benzene polycarboxylic acid or anhydrides thereof. Olefinic hydrocarbons which may be isomerized according to the process of this invention include straight and branched chain alkenes such as 1-butene, 2-butene, isobutylene, 1-pentene, 2-pentene, 2-methyl-1-butene, 2-methyl-2-butene, 3-methyl-1-butene, 1-hexene, 2-hexene, 3-hexene, 4-methyl-1-pentene, 3-methyl-1-pentene, 2-methyl-1-pentene, 4-methyl-trans-2-pentene, 4-methyl-cis-2-pentene, 2-methyl-3-pentene, 2-ethyl-1-butene, 2-ethyl-2-butene, 2,3-dimethyl-1-butene, 2,3-dimethyl-2-butene, 1-heptene, 2-heptene, 3-heptene, 2-methyl-1-heptene, 3-methyl-1-heptene, 4-methyl-1-heptene, 6-methyl-1-heptene, 2-methyl-2-heptene, 3-methyl-2-heptene, 4-methyl-2-heptene, 5-methyl-2-heptene, 6-methyl-2-heptene, 3-methyl-1-heptene, 3-methyl-2-heptene, 3-methyl-3-heptene, 2,3-dimethyl-1-heptene, 2,3-dimethyl-3-heptene, 2,3-dimethyl-4-heptene, the isomeric n and branched chains, octenes and nonenes, etc. It is contemplated within the scope of this invention that the aforementioned olefinic hydrocarbons are only representatives of the class of compounds which may be isomerized and that the present invention is not necessarily limited thereto.

The novel isomerization catalysts which are used in this invention, as hereinbefore stated, comprise benzene polycarboxylic acids and the anhydrides thereof such as 1,2-benzenedicarboxylic acid (phthalic acid), 1,3-benzenedicarboxylic acid (isophthalic acid), 1,4-benzenedicarboxylic acid (terephthalic acid), 1,2,3-benzenetricarboxylic acid (hemimellitic acid), 1,2,4-benzenetricarboxylic acid (trimellitic acid), 1,3,5-benzenetricarboxylic acid (trimesic acid), 1,2,3,4 - benzenetetracarboxylic acid (prehnitic acid), 1,2,3,4-benzenetetracarboxylic acid (mellophanic acid), 1,2,3,4,5-benzenetetracarboxylic acid (pyromellitic acid), benzenepentacarboxylic acid, benzenehexacarboxylic acid (mellitic acid), hemimellitic anhydride, trimellitic anhydride, trimesic anhydride, prehnitic anhydride, mellophanic anhydride, pyromellitic anhydride, mellitic anhydride, etc. These catalysts may be used alone or in combination with one another.

The isomerization of the aforementioned olefinic hydrocarbon is effected at temperatures ranging from about 0° to about 300° C. and preferably in a range of from about 200° to about 275° C. In addition, it is also contemplated that the reaction may be effected at pressures ranging from atmospheric to about 100 atmospheres or more, the pressure being used being dependent upon the particular compounds undergoing isomerization and generally being sufficient to maintain a major portion of the reactants in the liquid phase, the preferred pressures being from about 25 to about 50 atmospheres. The pressure required is usually provided for by the introduction of an inert gas such as nitrogen into the reaction vessel.

The process of this invention may be effected in any suitable manner and may comprise either a batch or a continuous type operation. For example, when a batch type operation is used a quantity of the desired catalyst and the olefinic hydrocarbon to be isomerized, if in liquid state, is placed in an appropriate apparatus such as the glass liner of a rotating autoclave. The liner is sealed into the autoclave and the pressure may be built up by introducing an inert gas such as nitrogen into the reactor. However, if the olefinic hydrocarbon to be isomerized is in gaseous form the isomerization catalyst is placed in the autoclave and the gaseous olefin is pressed in. The reactor is then slowly heated to the desired reaction temperature and maintained thereat for a predetermined period of time, after which the autoclave and contents thereof are cooled to room temperature. The excess pressure is vented and the reaction product is separated from the catalyst layer by conventional means such as distillation, decantation, filtration, etc. The separated reaction product is then subjected to fractional distillation and the desired isomerization product is recovered therefrom.

The present process may also be effected in a continuous type operation. In this type of procedure the olefinic hydrocarbon to be isomerized, in either gaseous or liquid form, is continuously charged to a reaction zone which is maintained at the proper operating conditions of temperature and pressure and which contains the desired isomerization catalyst. The reaction zone may comprise either an unpacked vessel or coil or may be lined with an adsorbent packing material such as fire brick, dehydrated bauxite, alumina or the like. Upon completion of the desired residence time the reaction product is continuously withdrawn and separated from the reactor effluent, the latter being recharged to form a portion of the feed stock, while the former is recovered and purified by conventional means hereinbefore set forth.

The following examples are given to illustrate the process of the present invention which, however, are not intended to limit the generally broad scope of the present invention in strict accordance therewith.

*Example I*

A mixture of hexenes containing 4-methyl-1-pentene, 3-methyl-1-pentene, 4-methyl-trans-2-pentene, 4-methyl-cis-2-pentene, n-hexene-1, trans-hexene-3, 2-methyl-1-pentene, 2-methyl-2-pentene, 2-ethyl-1-butene, 2-ethyl-2-butene, was placed in the glass liner of a rotating autoclave along with an isomerization catalyst comprising 10 g. of trimellitic anhydride. The liner was sealed into the autoclave and nitrogen pressed in until an initial pressure of 30 atmospheres had been reached. The autoclave and contents thereof were then slowly heated to a temperature of about 250° C. during a period of about six hours. At the end of this time the autoclave and contents thereof were cooled to room temperature, the excess pressure was vented and the reaction product separated from the catalyst. The product was then subjected to fractional distillation and the following changes in composition were noted.

| Original sample | After heating with catalyst and distilling | | | | |
|---|---|---|---|---|---|
| | Cut 1 | Cut 2 | Cut 3 | Cut 5 | Cut 7 |
| | *Percent* | *Percent* | *Percent* | *Percent* | *Percent* |
| cis-2-pentene, 4-methyl-1-pentene, 3-methyl-1-pentene, 4-methyl-trans-2-pentene | 3.5 | 10.2 | 9.5 | 8.4 | 4.9 | 1.1 |
| 4-methyl-cis-2-pentene | 0.5 | 4.7 | 2.8 | 2.0 | | |
| n-hexene-1, trans-hexene-3, 2-methyl-1-pentene | 10.8 | 29.1 | 29.7 | 28.2 | 24.2 | |
| 2-methyl-2-pentene, 2-ethyl-1-butene | 82.5 | 46.5 | 49.3 | 53 | | |

It is therefore noted that the various isomeric hexenes underwent an isomerization to form a different percentage of the components of the mixture than were originally present.

*Example II*

In this example a mixture of hexenes having a composition essentially the same as that described for the original sample in Example I above is placed in the glass liner of a rotating autoclave along with an isomerization catalyst comprising trimellitic acid. The liner is sealed into the autoclave and nitrogen pressed in until an initial pressure of 30 atmospheres is reached. The autoclave and contents thereof are then heated to a temperature of about 250° C. and maintained thereat for a period of about six hours. At the end of this time the autoclave and contents thereof are allowed to cool to room temperature, the excess pressure is vented and the reaction product recovered. Upon distillation the original content of the various isomeric hexenes will be found to have been altered, there being a greater percentage of some isomers present with a corresponding decrease in percentage of other isomers.

*Example III*

In this example a mixture of isomeric pentenes is treated in a manner similar to that set forth in the above examples using phthalic acid as the isomerization catalyst, the reaction conditions under which the isomerization is effected being similar to those set forth in the above examples. An examination of the reaction product will disclose that the percentages of the isomeric pentenes present in the original mixture will have undergone a change.

*Example IV*

In this example a mixture of isomeric butenes is contacted with an isomerization catalyst consisting essentially of prehnitic acid at a temperature of about 250° C. and an initial pressure of about 30 atmospheres of nitrogen. After completion of the residence time under the reaction conditions the reaction product is subjected to fractional distillation, an examination of the cuts of the distillation will disclose that the original percentages of the various butenes present in the mixture will have undergone a change.

*Example V*

A mixture of isomeric hexenes is contacted with hemimellitic acid at a temperature of about 250° C. and an initial nitrogen pressure of 30 atmospheres. Examination of the reaction product will disclose that the original percentages of the various isomeric hexenes present in the feed stock will be altered, there being an increase in some isomeric forms with a corresponding decrease in others.

I claim as my invention:

1. An olefin isomerization process which comprises contacting a reactant consisting essentially of at least one olefinic hydrocarbon with a catalyst consisting essentially of at least one compound selected from the group consisting of benzene polycarboxylic acids and anhydrides thereof at isomerization conditions, and recovering the resultant isomerized hydrocarbons.

2. An olefin isomerization process which comprises contacting a reactant consisting essentially of at least one olefinic hydrocarbon with a catalyst consisting essentially of at least one compound selected from the group consisting of benzene polycarboxylic acids and anhydrides thereof at a temperature in the range of from about 0° to about 300° C. and at a pressure in the range of from about atmospheric to about 100 atmospheres, and recovering the resultant isomerized hydrocarbons.

3. The process of claim 2 further characterized in that said catalyst consists essentially of hemimellitic acid.

4. The process of claim 2 further characterized in that said catalyst consists essentially of phthalic acid.

5. The process of claim 2 further characterized in that said catalyst consists essentially of trimellitic acid.

6. The process of claim 2 further characterized in that said catalyst consists essentially of trimellitic anhydride.

7. The process of claim 2 further characterized in that said catalyst consists essentially of prehnitic anhydride.

8. The process of claim 2 further characterized in that said reactant is a mixture of butenes.

9. The process of claim 2 further characterized in that said reactant is a mixture of pentenes.

10. The process of claim 2 further characterized in that said reactant is a mixture of hexenes.

References Cited in the file of this patent

UNITED STATES PATENTS 2,859,251     Linn _____ Nov. 4, 1958